United States Patent [19]
Bouton et al.

[11] Patent Number: 5,593,350
[45] Date of Patent: Jan. 14, 1997

[54] VIDEO GAME CARD HAVING INTERRUPT RESISTANT BEHAVIOR

[75] Inventors: Frank M. Bouton, Beaverton, Oreg.;
Robert L. Church, Tujunga, Calif.;
Joseph C. Rayhawk, Beaverton, Oreg.

[73] Assignee: Thrustmaster, Inc., Hillsboro, Oreg.

[21] Appl. No.: 334,877

[22] Filed: Nov. 4, 1994

[51] Int. Cl.[6] .............................. G06F 3/05; G06F 13/10
[52] U.S. Cl. .................. 463/36; 463/47; 273/148 B; 364/188
[58] Field of Search ............................ 273/434, 148 B, 273/438; 345/156, 162, 172; 364/410, 190, 188; 463/36, 47, 37

[56] References Cited

U.S. PATENT DOCUMENTS

| | | |
|---|---|---|
| 4,501,424 | 2/1985 | Stone et al. . |
| 4,516,777 | 5/1985 | Nikora . |
| 4,588,187 | 5/1986 | Dell . |
| 4,659,313 | 4/1987 | Kuster et al. . |
| 4,852,031 | 7/1989 | Brasington . |
| 4,868,780 | 9/1989 | Stern . |
| 4,916,440 | 4/1990 | Faese et al. ............................ 345/156 |
| 4,924,216 | 5/1990 | Leung . |
| 5,134,395 | 7/1992 | Stern . |
| 5,166,666 | 11/1992 | Tanaka .................................... 345/156 |
| 5,245,320 | 9/1993 | Bouton . |
| 5,428,355 | 6/1995 | Jondrow et al. ........................ 364/190 |

FOREIGN PATENT DOCUMENTS 1487915  6/1989  U.S.S.R. .

OTHER PUBLICATIONS

Eggebrecht, Lewis C., Interfacing to the IBM Personal Computer, 1987, pp. 129–197–199.

*Primary Examiner*—Jessica Harrison
*Assistant Examiner*—James Schaaf
*Attorney, Agent, or Firm*—Marger, Johnson, McCollom & Stolowitz, PC

[57] ABSTRACT

A high precision game card generates a digital signal corresponding to each analog input signal from a controller. Each digital signal has a digital value proportional to the number of "reads" to the game card by a computer microprocessor. The digital signals can therefore be read by the computer without disabling the computer interrupts. The game card converts the analog input signals to a corresponding numeric value and this value is compared with an output of a counter which counts the number of "reads" by the computer. If the number of "reads" equals or exceeds the numeric representation, the corresponding digital signal is deasserted. The digital signals are initially asserted responsive to a "write" to the game card by the computer microprocessor. Alternatively, the numeric representations can be provided directly to the computer over the computer data bus. This embodiment provides all of the numeric representations over a single address.

41 Claims, 9 Drawing Sheets

VIDEO GAME CARD HAVING INTERRUPT RESISTANT BEHAVIOR

BACKGROUND OF THE INVENTION

This invention relates generally to video game systems and more particularly to game cards therefor.

A game card is used to interface external game controllers to personal computers. These game controllers are typically used to provide input to a video game or simulation program running on the personal computer. The game card provides a standard interface to the game controllers as described in U.S. Pat. No. 5,245,320 issued to Bouton. The standard game card interface includes four discrete inputs and four analog or variable inputs. The discrete inputs are used to input discrete digital signals, such as produced by switches, to the personal computer. The analog inputs are used to input continuously variable inputs such as those generated by potentiometers.

The personal computer periodically polls the discrete inputs of the game card to determine the state of the corresponding discrete input devices. Reading these discrete inputs directly presents no problem because the discrete switch outputs are in fact digital signals that can be read directly by the personal computer microprocessor on its data bus. The microprocessor, however, cannot directly determine the state of the input devices coupled to the analog inputs because the purely digital microprocessor cannot accept analog signals.

To allow the microprocessor to determine the state of the input devices coupled to the analog inputs, the game card includes a timer circuit that converts the analog signal level to corresponding pulse width. The timer signal is initially asserted responsive to a "write" to the game card by the microprocessor. A "write" is an output operation performed by the microprocessor responsive to execution of a write instruction ("OUT") fetched from memory. A write to the game card, which is located at a predetermined address in the PC's memory map, generates a plurality of control signals that enable the game card to receive the written data. Similarly, a "read" is an input operation performed by the microprocessor responsive to the execution of a read instruction ("IN") fetched from memory. A read from the game card, i.e., at the predetermined address, enables the game card to provide the requested data to the microprocessor.

The "write" sets a one shot RC circuit in the timer which causes the timer signal to be asserted. The signal thereafter decays as a decaying exponential function of the analog signal level. Thus, the higher the analog signal level, the longer the decay of the timer signal. The microprocessor thereafter continuously polls the timer signal until it detects the timer signal deasserted. The personal computer can then determine the analog signal level from the pulse width of the timer signal. This sequence is shown in FIG. 1.

FIG. 1 shows a conventional method employed by the microprocessor for processing the analog input signals of the game card. First, a counter is initialized to zero in 12. Next, the usual microprocessor interrupts are disabled in 14 to ensure that the routine is not preempted by an interrupt service routine. If the interrupts were not disabled, the computer would lose its frame of reference during an interrupt service routine and thereby compromise the accuracy of the pulse width determination. Next, the microprocessor fires the single shots of the timer at 16 by writing to a predetermined address in the game card. In an IBM-compatible personal computer this address is equal to 0201H. The microprocessor then enters a loop comprising steps 18 and 20 where the timer signal is read and, if asserted, i.e. high, the counter is incremented. This sequence continues until the timer signal is deasserted, at which point the interrupts are reenabled in 22. Thereafter, the analog signal level is calculated based on the counter value. This calculation is in two steps. First the timer signal pulse width is determined. This pulse width is determined by multiplying the counter value by the time per loop iteration. Once the timer signal pulse width is determined, the corresponding analog signal level is ascertained by a predetermined function, typically residing in a lookup table.

There are several problems with the above-described method. The first is that the interrupts must be disabled to maintain accuracy. If the interrupts were not disabled, and the procedure was interrupted in its inner loop, for example, the timer signal would continue to decay while the microprocessor was servicing the interrupt. This lost time would compromise the accuracy of the resulting analog signal level calculation. The problem with disabling interrupts is that other tasks that are interrupt driven go unserviced while the interrupts are disabled. For example, in a video game, the screen is typically updated responsive to an interrupt. Thus, while the microprocessor is processing the timer signals, the screen goes unupdated. This can result in choppy images being displayed, which compromises the life likeness and continuity of the video game. This problem is exacerbated by modern pre-emptive multi-tasking operating systems which depend heavily on interrupts.

Another problem with the prior art approach is that the counter value can become extremely large in fast personal computers. The increase in clock rates and I/O speeds means the personal computer can read the game card rapidly, thereby increasing the counter value accordingly. As the counter value gets above a certain point, the computations involved in determining the analog signal level become complex as well. In particular, full 32-bit multiplication is required to determine the timer pulse width. This added complexity further increases the time required to process the analog inputs of the game card.

Accordingly, a need remains for a game card that does not need to disable interrupts and yet maintains a high degree of accuracy in determining the analog input signal levels.

SUMMARY OF THE INVENTION

It is, therefore, an object of the invention to provide a game card for a personal computer which can operate without disabling interrupts while achieving precision accuracy.

The game card according to the invention includes a circuit board for mounting electrical components and connectors thereon which is adapted to be received by the personal computer. The game card includes a game card connector for receiving analog signals from a game controller as well as discrete signals therefrom. The analog signals indicate the variable state of a corresponding controller input device such as a joystick handle. The circuit board includes a bus connector for connecting the circuit board to the personal computer data and control busses. In the preferred embodiment, this bus connector is a male edge type connector. The game card further includes a circuit means for providing a digital signal to the microprocessor corresponding to the signal level of a respective analog signal. The digital signal is asserted responsive to a "write" to the game card by the personal computer microprocessor and is deasserted responsive to a number of "reads" by the microprocessor. The number of "reads" which is required before the digital signal is deasserted is determined by the analog signal level.

Thus, the pulse width of the resulting digital signal is a function of the number of reads and not decay rate of the analog signal level. This aspect of the invention permits operation of the personal computer microprocessor to read the game card outputs to be interrupted for one or more microprocessor cycles while maintaining accuracy in pulse width determination. This feature allows the game card to be used without the interrupts being disabled.

In another aspect of the invention, the game card includes means for converting the analog signals to a corresponding numeric representation and providing the numeric representation to the personal computer responsive to a "read" to the game card by the personal computer. In the preferred embodiment, the game card includes an analog to digital converter which samples the analog signal level and produces a corresponding numeric representation. The numeric output of the analog to digital converter is then provided to the personal computer microprocessor over the personal computer data bus. Because the game card occupies but a single address in the personal computer address space, this embodiment of the invention further includes a means for providing a plurality of different numeric representations corresponding to different analog signals at the same single address. This means includes, in the preferred embodiment, a loadable counter which is loaded with an initial address responsive to a "write" to game card by the microprocessor. The game card then provides a numeric value corresponding to the initial address responsive to a "read" from the game card by the microprocessor. The game card thereafter provides the numeric value of a subsequent analog input responsive to subsequent "reads" by the microprocessor. In this manner, all of the plurality of numeric values are provided over a single address.

An advantage of the present invention is an increase in speed and accuracy in determining the analog signal levels.

Another advantage of the present invention is to simplify the computations that are required to compute the analog signal levels.

A further advantage of the present invention is the elimination of the non linearity of the RC timer circuit in the prior art timer circuit.

The foregoing and other objects, features and advantages of the invention will become more readily apparent from the following detailed description of a preferred embodiment of the invention which proceeds with reference to the accompanying drawings.

DETAILED DESCRIPTION

Figure 1:
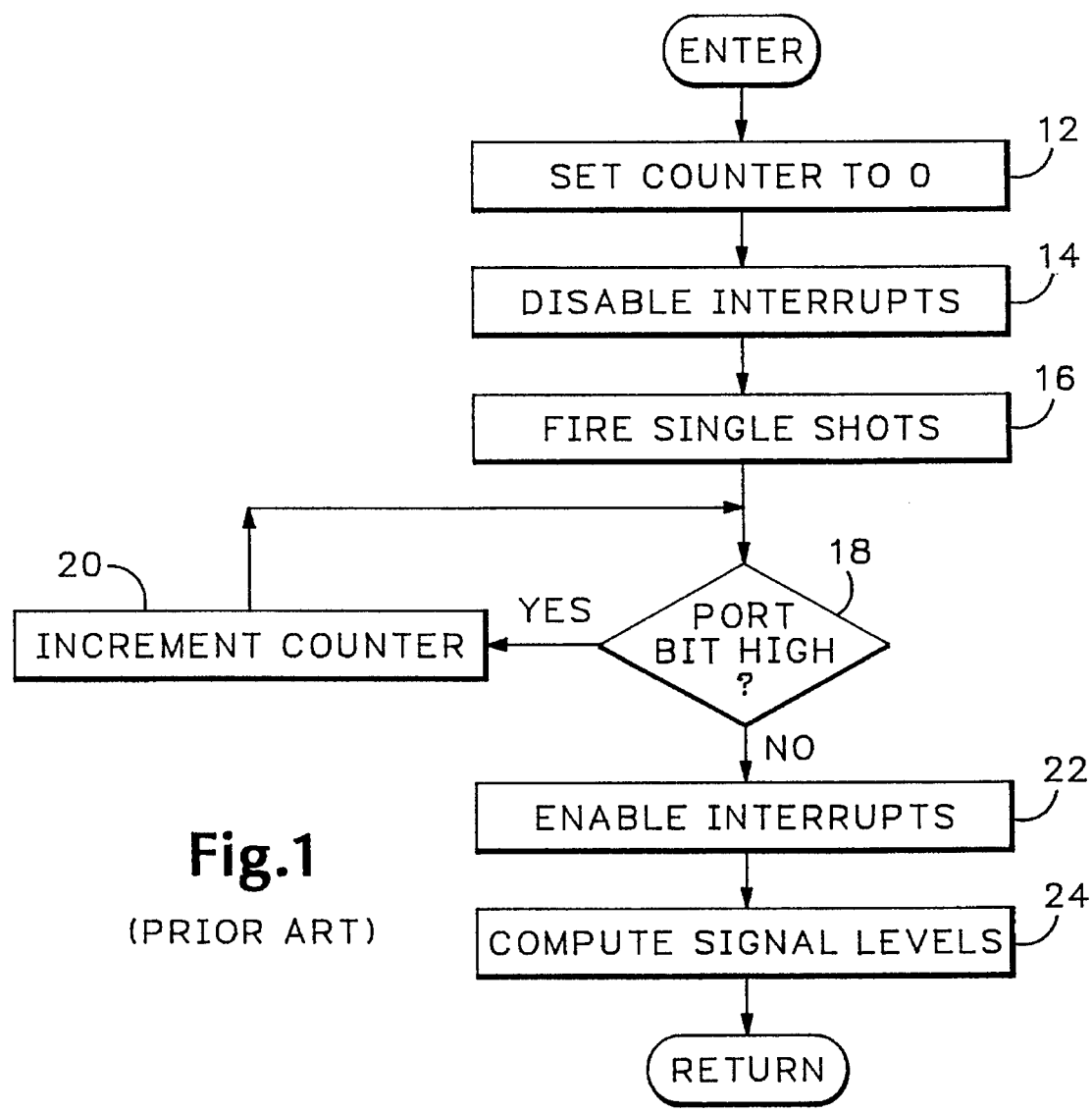
FIG. 1 is a flow chart for a prior art method of processing the analog signals of a prior art game card.
Figure 2:
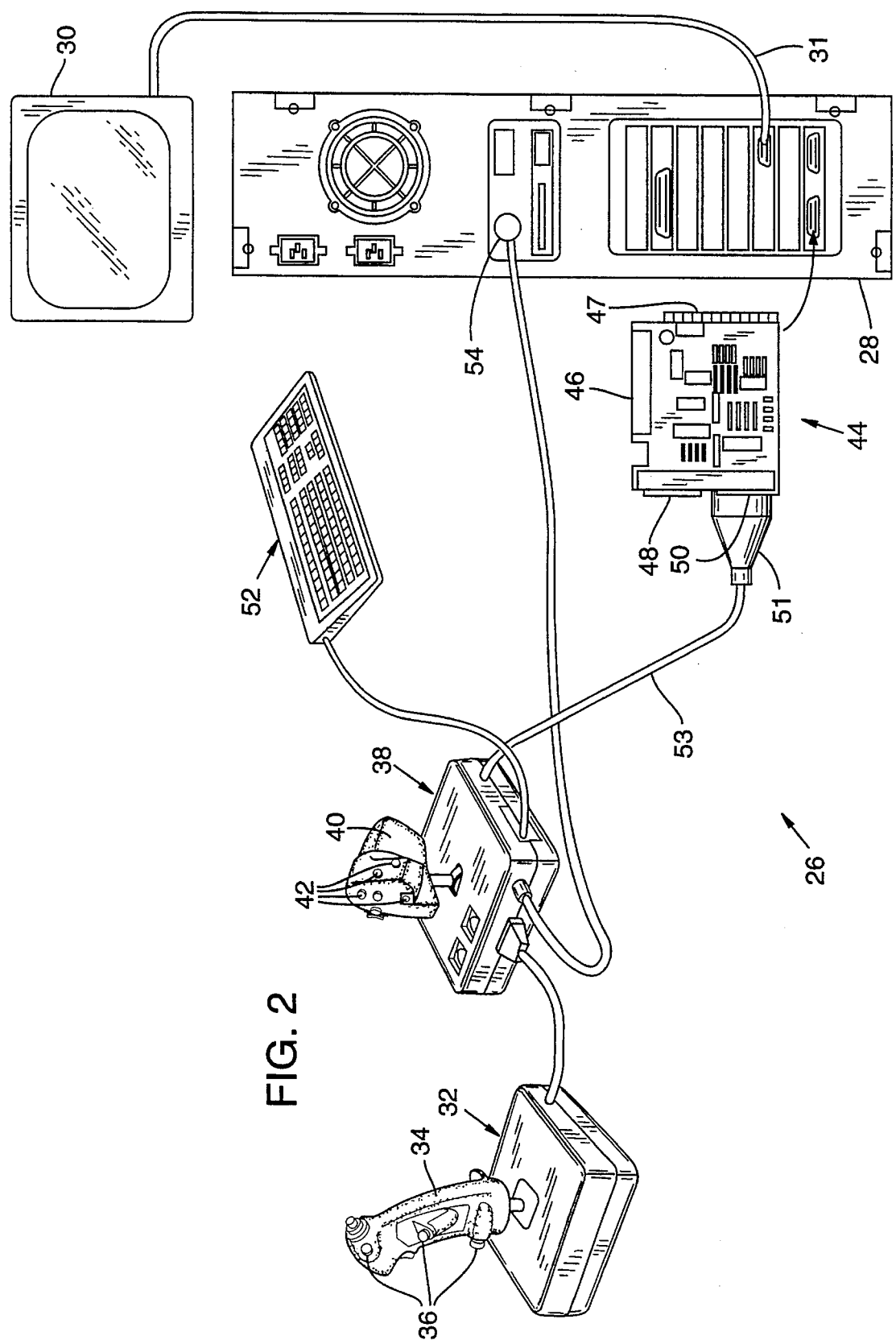
FIG. 2 is a pictorial drawing of a video game system using a game card according to the invention.

Referring now to FIG. 2, a video game system 26 according to the invention is shown. This system includes a personal computer 28, which includes a microprocessor (not visible) for executing a video game application program and other software operating thereon. Although in the preferred embodiment, the personal computer is an IBM compatible computer, the invention hereinafter described can be interfaced to any computer operable under the control of a video game or simulation program. The term "computer" as used herein includes all computers, regardless of the underlying operating system, e.g., DOS, Windows, UNIX, etc., or the number and/or type of processor, as well as video game platforms such as those manufactured by Nintendo, SEGA, Atari, 3DO, etc.

A display 30 is coupled to the personal computer (PC) via a display cable 31, as is known in the art. The system includes a joystick controller 32 which has a handle 34 and a plurality of discrete input devices 36. The handle 34, as known in the art, is coupled to a potentiometer which produces a variable or analog signal responsive to movement of the handle. The level of the resulting analog signal indicates the position of the handle. The system 26, as shown in FIG. 2, also includes a second throttle controller 38, which also includes a handle 40 and a plurality of discrete input devices 42. The discrete input devices 42 are discrete switches that generate a discrete or digital signal responsive to actuation thereof.

The throttle controller 38 is coupled to the PC 28 by a game card 44, which is the focus of the current invention. The game card 44 includes a printed circuit board 46 which is adapted to be received in a slot of the PC, as is known in the art. The slot in the PC includes guide rails (not visible) that receive the lateral ends of the game card 44 and guide the game card into the PC. The game card 44 includes a bus connector 47, which in the preferred embodiment is a male edge connector that mates with a compatible female connector in the PC. The game card further includes two game card connectors 48 and 50, which are adapted to receive a mating connector 51 of the controller 38. Although the joystick controller 32 is shown connected to the throttle controller 38, the joystick 32 can be connected to the game card connector 48 as well. The game card 46 is referred to as a dual ported game card because it has two game card connectors.

In the preferred embodiment, the controller 38 is coupled to a keyboard interface port 54 of the PC 28, while the PC keyboard 52 is connected to the throttle controller 38. This configuration allows the throttle controller to transmit key codes to the personal computer that correspond to the discrete and/or analog inputs of the controllers 32 and 38. However, some or all of the analog game controllers 32 and 38 are coupled to the game card 44 via a cable 53. The cable 53 includes at least 8 conductors. Four of these conductors are dedicated to providing discrete signal inputs to the game card while the other four are for providing analog input signals thereto.

In operation, the personal computer 28 generates images on the display 30 according to the video game program executing thereon. The video game receives discrete and analog inputs via the game card and modifies or adjusts the displayed images responsive thereto. An example of such a video game is "Falcon" manufactured by Spectrum Holobyte.

Figure 3:
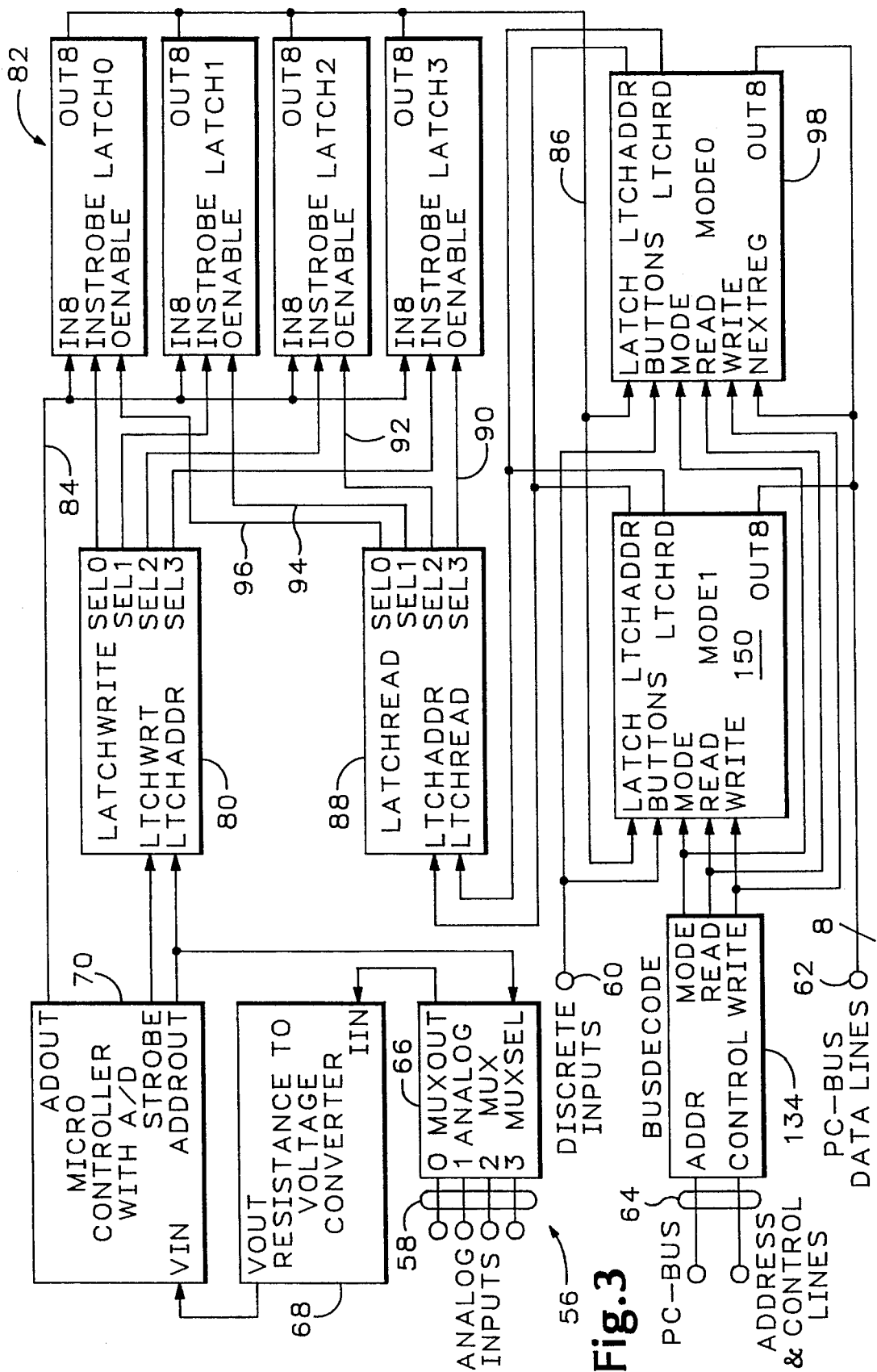
FIG. 3 is a block diagram of the game card according to the invention.

Referring now to FIG. 3, a block diagram of the electrical components mounted on the game card 44 is shown generally at circuit 56. The block diagram is a simplified block diagram in that it only shows the components necessary to support a single game card connector or port. The invention hereinafter described can readily be extended to support both connectors by one having ordinary skill in the art. As will be apparent to those having such skill, extending the invention to cover both connectors requires essentially duplicating the circuitry shown in FIG. 3.

The game card circuit 56 has several inputs. The first set of inputs are the analog inputs 58. These analog inputs receive the analog input signals produced by the game controller. Another set of inputs and outputs are the discrete inputs 60, which receive the discrete input signals of the controller. The inputs 58 and 60 are included in the game card connector 50, as shown in FIG. 2. Another set of inputs are the PC data and control busses 62 and 64, respectively. The busses 62 and 64 are coupled to the edge connector 47. The data bus 62 is an 8-bit bidirectional bus, as defined by the bus architecture of the PC. The control bus 64 includes not only the standard control lines, as are known in the art, but also the address lines of the PC bus.

The analog inputs 58 are coupled to an analog multiplexer 66. This multiplexer includes a plurality of inputs (0–3), a select input (MUXSEL) and a single multiplexer output (MUXOUT). The multiplexer 66 provides one of the analog inputs to the multiplexer output responsive to an address applied to a multiplexer select input (MUXSEL). In the preferred embodiment, the analog multiplexer 66 includes eight analog switched, e.g., 74LS4051, selectable by a 3-to-8 decoder such as a 74LS138.

Figure 4:
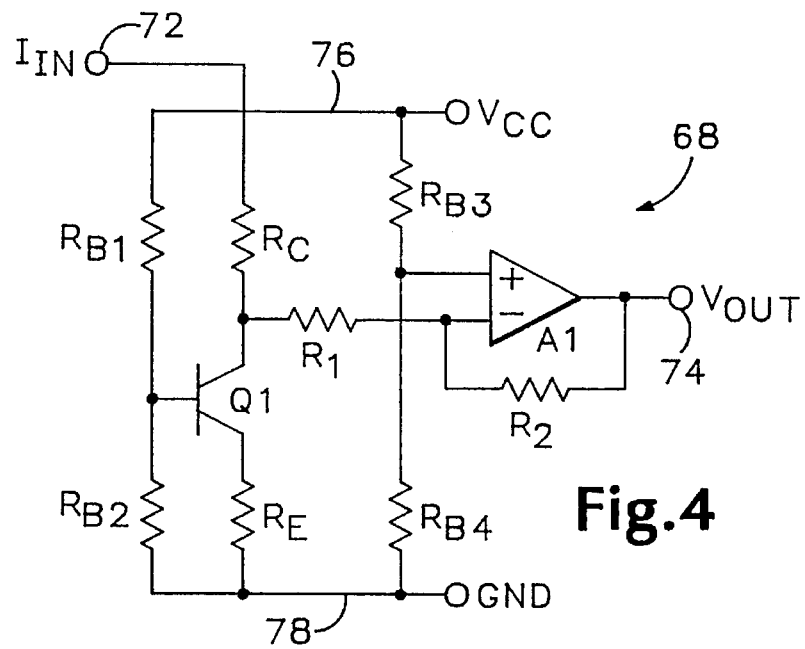
FIG. 4 is a schematic of a resistance to voltage converter of FIG. 3.

The output of the analog multiplexer 66 is connected to a circuit 68 which will develop a voltage signal that is proportional over a specific range of resistances to the resistance of the analog input 58. A schematic of the resistance to voltage converter is shown in FIG. 4. This circuit includes two major subsections. The first section includes a bipolar transistor Q1 having a base, a collector and an emitter and a set of four resistors, $R_{B1}$, $R_{B2}$, $R_C$, $R_E$.

This section is a fixed-current sink set up to draw constant current $I_{IN}$ from an analog input 72. The analog input device of the controller is typically a potentiometer connected to +5 volts. Drawing a constant current through this will produce a voltage drop that is proportional to the resistance of the input device. Hence, this section of the circuit is a resistance to voltage converter. The resistors $R_{B1}$ and $R_{B2}$ are a voltage divider between the positive supply line 76 and the ground line 78 that establish a bias point for the base of transistor Q1. The transistor Q1 will be operating in what is known in the art as the forward active region. In this region, the voltage at the emitter of Q1 will be at an approximately fixed voltage below that at the base of Q1. The voltage at the base is set so that an approximately fixed voltage will be seen at the emitter. The resistor $R_E$ is connected between the emitter and ground. The fixed voltage at the top of $R_E$ will cause a fixed current to flow in $R_E$. Most of this current will come from current drawn into the collector of Q1. The current into the collector will flow from the positive supply line through the input resistance, the selected channel in the analog multiplexer and the resistor $R_C$. The resistance of the active channel is small compared to the input resistance and $R_C$. $R_C$ is designed to offset and center the voltage swing at the collector of Q1.

The second portion of the circuit 68 is an inverting and scaling buffer amplifier. The first section of the circuit produces a voltage that goes down as the resistance of the input goes up. This is opposite to what is needed. Hence, the second part of the circuit includes an inverter. In order for the first part of the converter to operate properly, the voltage swing at its output cannot reach the supply rail. However, the voltage will vary linearly with input resistance over a narrower range. The buffer amplifier part of the circuit not only inverts the swing but increases it to the full supply range, e.g., 0 to +5 volts.

The output of the first section is fed through R1 to the negative input of an op-amp A1. The output of A1 is fed back to its negative input through R2. R1, R2 and A1 form an inverting and scaling amplifier. The positive input to A1 is a voltage set by voltage divider network composed of resistors $R_{B3}$ and $R_{B4}$. The output of the voltage divider sets the value of the voltage needed at the negative input of A1 to force the output of A1 to zero.

As will be apparent to those skilled in the art of analog design, the converter 68 produces an output voltage signal $V_{out}$ which is proportional to the resistance attached between the active channel of the analog multiplexer and the supply voltage.

Referring again to FIG. 3, the resistance to voltage converter 68 is coupled to a microcontroller 70. The output of the converter 68 ($V_{OUT}$) is coupled to an A-to-D input ($V_{IN}$) of the microcontroller 70. The microcontroller 70 includes a built in analog-to-digital converter for converting the voltage signal appearing on the A-to-D input ($V_{IN}$) to a numeric representation. In the preferred embodiment, this numeric representation is an 8-bit binary value. In the preferred embodiment, microcontroller 70 is a part no. PIC16C71 manufactured by Microchip of Chandler, Ariz.

The controller 70 includes three sets of outputs. The first is an address output (ADDROUT) that is coupled to the select input (MUXSEL) of the analog mux 66 and an address input (LTCHADDR) of a latch write control circuit 80. The microcontroller 70 provides an address at the address output which is supplied to the analog mux 66 and the latch write control circuit 80. The address specifies one of the analog inputs to be converted, which is supplied to the resistance to voltage converter 68 and thus the microcontroller 70. The address also causes the latch write control circuit 80 to generate a corresponding select signal, as described further below.

The microcontroller includes a second output (STROBE) which is coupled to an input of the latch write control circuit 80 (LTCHWRT). The microcontroller 70 produces a signal on this output which is effectively an enable signal. This signal causes the latch write control circuit 80 to produce a signal on one of a plurality of outputs (SEL0–SEL3) as determined by the address generated by the microcontroller 70. Thus, the latch write control circuit is essentially a decoder having an enable input controlled by the microcontroller strobe signal.

The third set of outputs of the microcontroller 70 is an address/data output bus. The output bus (ADOUT) is coupled to a plurality of latches 82 via a microcontroller data bus 84. There is one latch for each one of the analog inputs 58. The latches store the numeric representation of the corresponding analog input signal level. This numeric representation is provided on the data bus 84 and latched into the corresponding latch by the latch write control circuit 80 responsive to a strobe in enable signal being generated by the microcontroller 70. The outputs of the latch write control circuit (SEL0–SEL3) are coupled to a latch or clock input (INSTROBE) of the corresponding one of the latches 82.

The latches 82 are, in the preferred embodiment, tristateable 8-bit latches having a tristate output (OUT8), which are controlled by a signal appearing on an output enable input (OENABLE) of the latch. These output enable signals are generated by a latch read control circuit 88 having a plurality of outputs (SEL0–SEL3), on which the output enable signals are generated. The outputs of the circuit 88 are connected to a corresponding one of the latches 82 via the signal lines (90, 92, 94 and 96). The latch read control circuit 88 is similar to the latch write control circuit 80 in that it has an address input (LTCHADDR) and an enable or strobe input (LTCHREAD). Once again, the latch read control circuit 88, as with the latch write control circuit 80, operates essentially as an address decoder.

The outputs of the latches 82 are coupled to a first logic block 98, which implements one aspect of the present invention. The logic block 98 includes a plurality of inputs. One of these inputs (LATCH) is coupled to the output of the latches 82 via a data bus 86. Another input (BUTTONS) is coupled to the discrete input 60 for receiving the discrete input signals therefrom. Another input (MODE) receives a mode signal which indicates the current mode to the game controller. The state of this so called mode signal determines whether the game controller provides a numeric representation of the analog inputs or a discrete, digital, single bit representation for each analog input. The use and control of the mode signal will be described further below. Two other inputs (READ, WRITE) indicated to the logic block 98 whether the personal computer microprocessor is currently executing a "read" from or "write" to the game card. Finally, the logic block 98 includes an input (NEXTREG), which is coupled to the PC data bus 62 for receiving an initial register address from the personal computer microprocessor. This initial register address specifies which one of the numeric representations held in the latches is to be provided by the game card to the PC.

Figure 5:
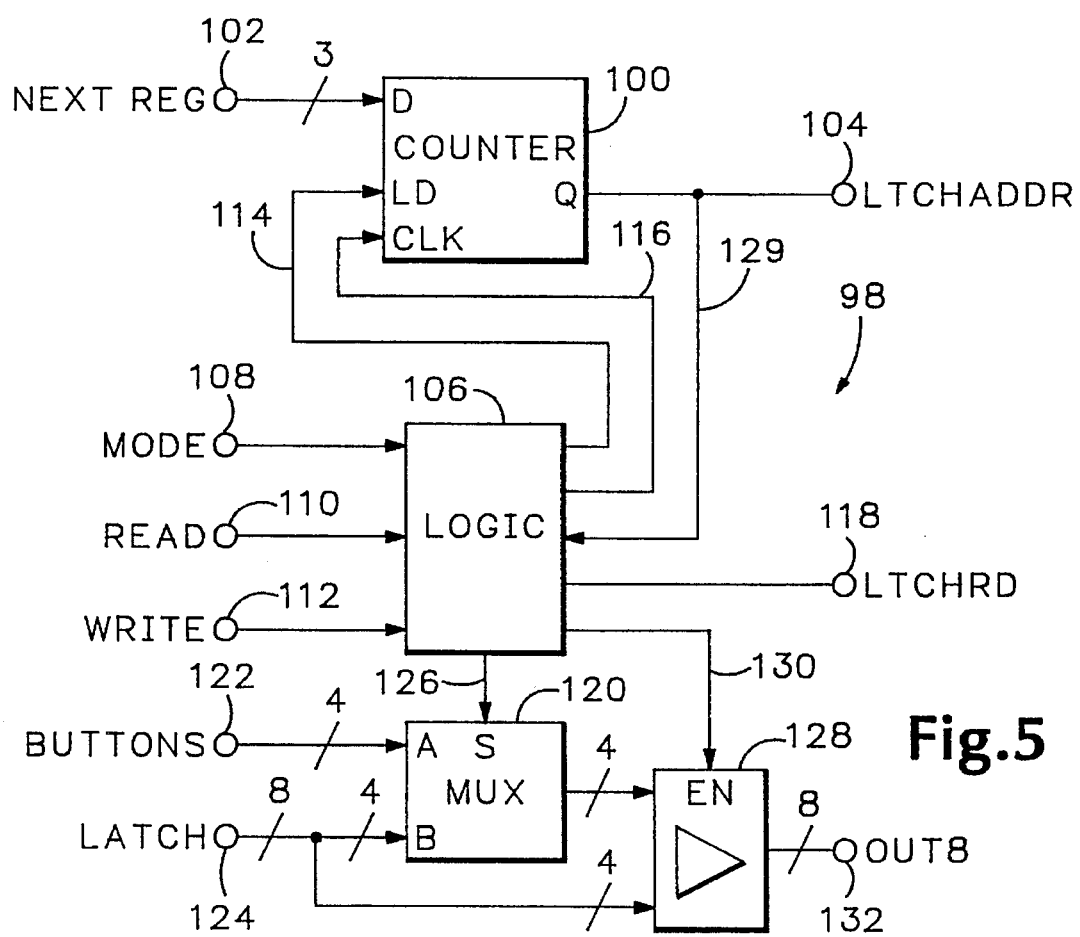
FIG. 5 is a schematic of a logic block of FIG. 3.

The logic block 98 (hereinafter mode 0 logic 98) includes three outputs (LTCHADDR, LTCHRD, OUT8). The purpose of each of these outputs is described below with reference to a preferred embodiment of the logic block 98, as shown in FIG. 5. The preferred embodiment of the logic block 98 includes a loadable counter 100. The loadable counter includes a data input (D), a load input (LD), a clock input (CLK), and an output (Q). The counter gets loaded with the initial register address written to the game card by the personal computer microprocessor. This value is loaded into the counter responsive to a load signal produced by a logic block 106. This initial register address is then produced as an output from the logic block 98 on the output 104 (LTCHADDR).

The logic circuit 106 is coupled to inputs 108 (MODE), 110 (READ), 112 (WRITE) for receiving a mode signal, a read signal, and a write signal, respectively. The logic circuit 106 generates a load signal (LD) responsive to a "write" to the game card, as indicated by the write signal, when mode 0 is active, as indicated by the mode signal at input 108. This load signal causes the initial register address on the input 102 (NEXTREG) to be loaded into the counter.

The logic circuit 106 also generates a clock signal on a line 116 coupled between the logic block and the clock input (CLK) of the counter 100. The clock signal is generated responsive to a "read" by the microprocessor to the game card, during mode 0, as indicated by the mode signal. The logic circuit 106 also generates a latch read signal on output 118 (LTCHRD). This latch read signal along with the latch address causes one of the numeric representations held in the latches, as determined by the latch read control circuit 88, to be provided to the logic block 98.

The discrete inputs are provided to the logic block 98 via input 122 (BUTTONS) coupled to an input of a digital multiplexer 120. The numeric representation is provided to the logic block 98 via input 124 (LATCH). Four bits of input 124 are coupled to an input of the multiplexer 120 while the other four bits are coupled to a tristate driver 128. The multiplexer has a select input (S) that is driven by the logic circuit 106. The logic circuit 106 generates a select signal on line 126 to select either the discrete inputs or four bits of the numeric representation to provide to the tristate driver 128. The logic circuit generates the select signal responsive to the latch address on bus 129 coupled between the counter 100 and the logic block 106. In the preferred embodiment, the discrete inputs are assigned to a latch address of 0.

The tristate drive 128 is controlled by an enable signal generated by the logic block 106 on line 130 coupled to an enable input (GEN) of the driver 128. The tristate driver operates in a conventional manner.

Figure 6:
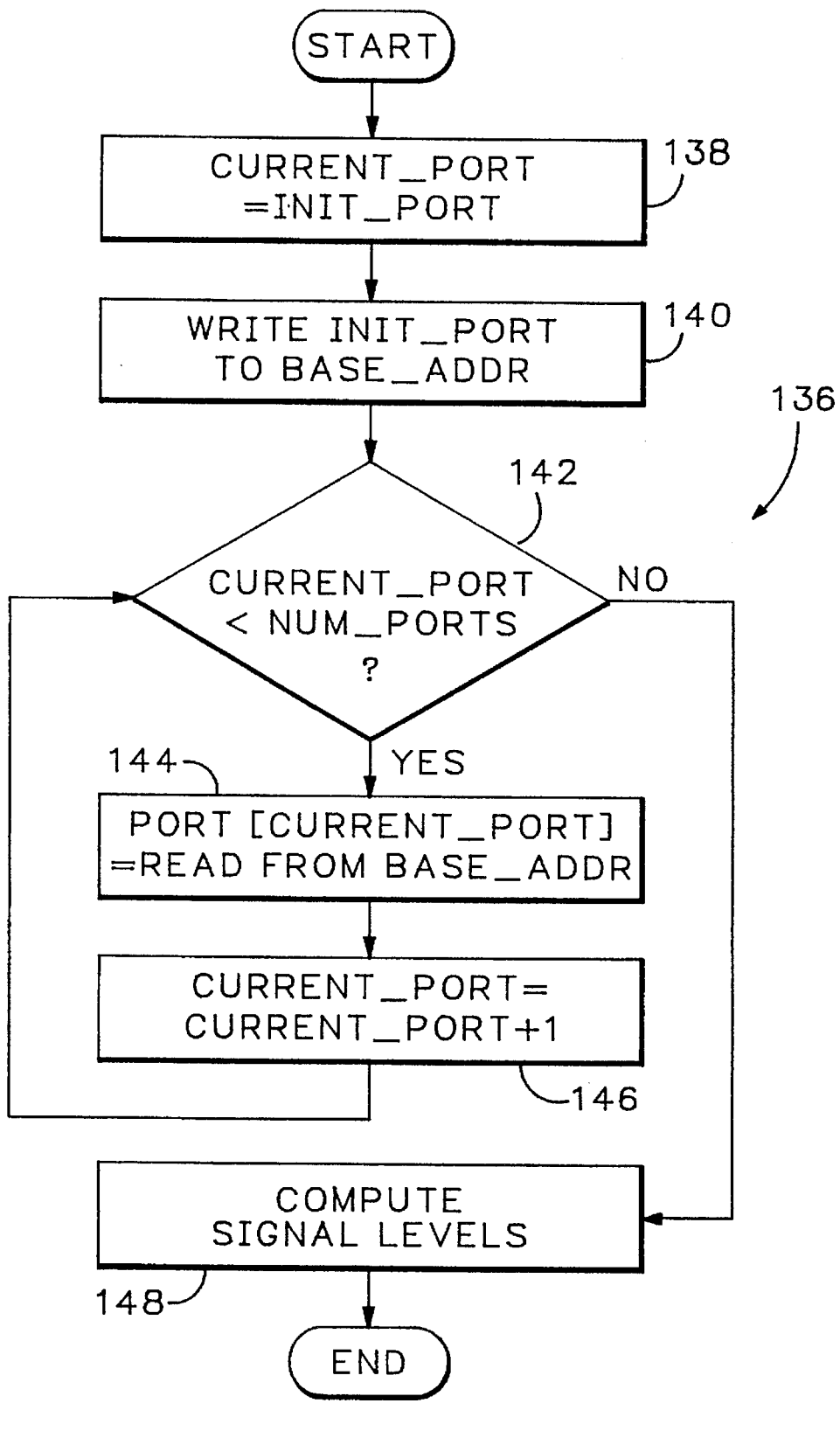
FIG. 6 is a flow chart for a method of processing analog input signals of the game card according to a first aspect of the invention.

The operation of this first aspect of the invention can be understood with reference to the flow chart given in FIG. 6. The flow chart of FIG. 6 shows a method 136 of processing the numeric representations generated by the game board. The method 136, in the preferred embodiment, is implemented in software executed by the microprocessor in the personal computer.

The first step 138 is to establish an initial register address or port address. A port is defined as a unique set of inputs provided by the game card 56. Thus, the ports include the outputs of registers 82 as well as the discrete inputs of the game controller. In the embodiment shown in FIG. 3, there are five separate ports, four register ports and a discrete input port. In the preferred embodiment, using an address card with two game connectors, there can be up to ten ports.

This initial step determines the first port that will be read from the game card. In step 140, the initial port is written to the base address of the game card. This base address is determined by the memory map of the personal computer. As described above, the value that is written to the game card is latched into the counter 100. Thus, the write establishes the initial port that can be read by the personal computer.

The method 136 next checks in step 144 whether the current port variable established in step 138 is less than the maximum number of ports. As described above, this maximum number of ports can vary depending upon the embodiment of the game card used. In the preferred embodiment, the maximum number of ports is five, i.e., one for the discrete switches and four for the analog inputs. If the current port is less than the maximum number of ports, a "read" from the game board is executed at 144. This read will either be a numeric representation of an analog input or a set of discrete inputs depending upon which port is currently being read. The value read from the game card is then stored in an array. The array has as many elements as there are ports so that each port has a corresponding element in the array.

The current port variable is then incremented by one in 146 and the variable compared to the maximum number of ports in step 142. If the variable is again less than the number of ports, the next port is read. This sequence continues until all the ports in the game card are read. Thus, the numeric representations of the analog inputs, along with the discrete inputs are provided to the personal computer at a single address.

Once all the numeric representations have been read, the corresponding signal levels can be determined in step 148. This operation can be implemented by accessing a simple lookup table or by computing a mathematical expression. Once the signal levels are computed, the method 136 can provide this level to the video game program to effect a corresponding change in the display images.

The above described method 136 assumes that the game port has been first set in the appropriate mode. The mode is established by a "write" to a predetermined address in the address space of the game card in an initial calibration step. The method of establishing the mode is described further herein below.

Referring again to FIG. 3, the game card 56 includes a second logic circuit 150 implementing a second aspect of the invention, referred to herein as mode 1. The mode 1 logic 150 includes all the same inputs and outputs as the mode 0 logic circuit 98 with the exception of the input (NEXTREG) coupled to the data bus 64. In addition, the latch input differs from the latch input of the mode 0 logic circuit in that the latch input of the mode 1 logic includes 32 bits, 8 bits for each register output.

Figure 7:
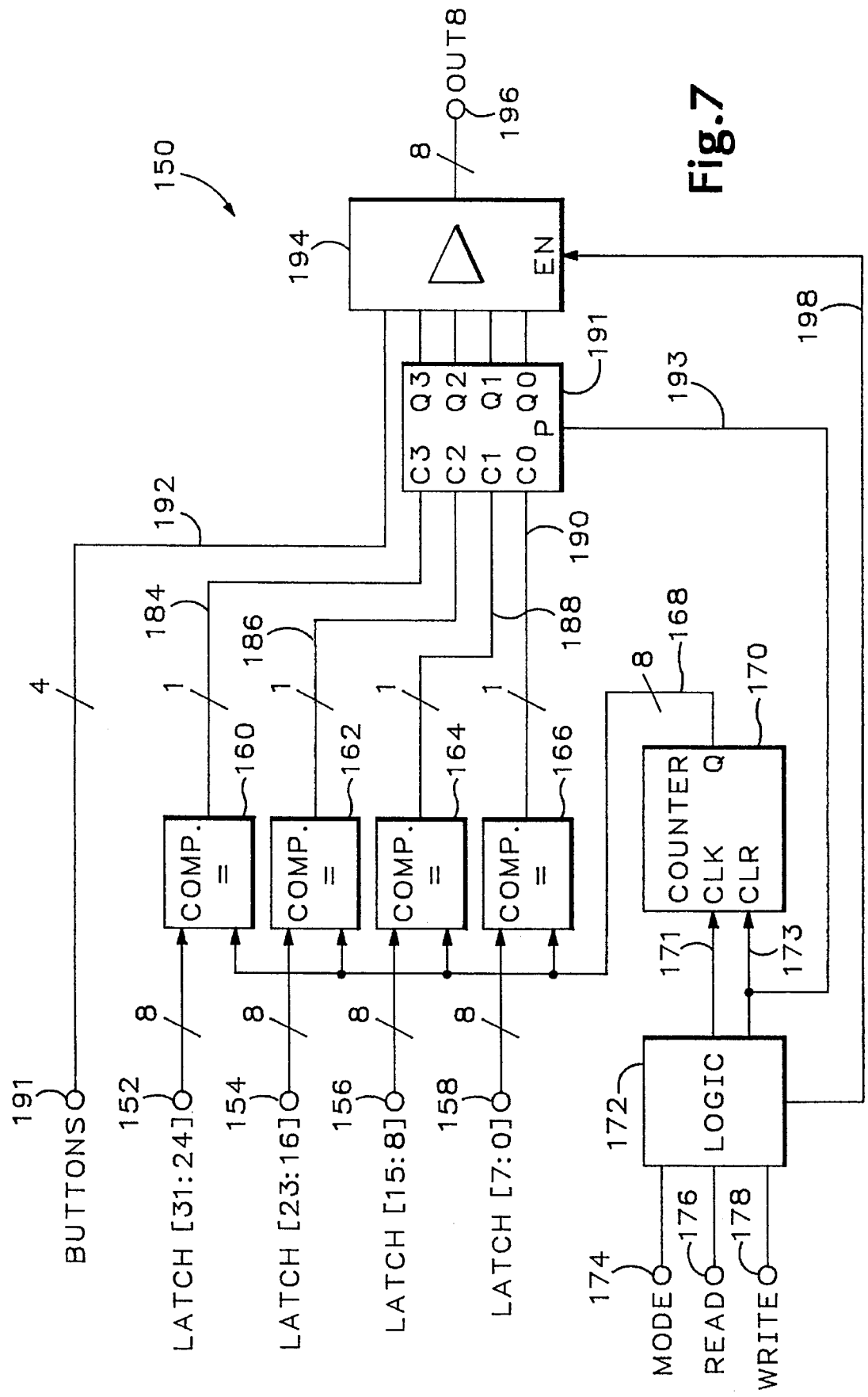
FIG. 7 is a schematic of a logic block of FIG. 3.

A preferred embodiment of the mode 1 logic circuit 150 is shown in FIG. 7. As shown therein, the latch input is broken up into four discrete inputs 152–158, each having 8 bits. Each of the latch inputs, e.g., 152, is coupled to a respective latch output (OUT8) for receiving a numeric representation of a corresponding analog input therefrom.

Each of the latch inputs 152, 154, 156 and 158 is coupled to an input of a corresponding comparator 160, 162, 164 and 166, respectively. Each comparator includes a second input that is coupled to an output of a counter 170 via a bus 168. The comparators compare the numeric representation provided by the corresponding latch with the output of the counter. If the numeric representation is equal to the counter output, the comparator asserts an output signal to indicate that the comparison produced a positive result. If the numeric representation is not equal to the counter value, on the other hand, the output signal of the comparator is deasserted.

The counter 170 has two inputs: a clock input (CLK) and a clear input (CLR) these two inputs operate in their normal manner. These two inputs are driven by a logic circuit 172 via lines 171 and 173 coupled between the logic circuit and the counter. The logic circuit 172 has coupled thereto inputs 174 (MODE), 176 (READ), and 178 (WRITE) for receiving the mode signal, the read signal, and the write signal, respectively. The logic 172 generates a clock signal on line 171, coupled to the clock input of the counter, responsive to a read signal on input 176. The logic 172 also generates a clear signal on line 173, responsive to a write signal on input 178. Thus, the clear signal is asserted during a "write" that places the game card into mode 1. One of ordinary skill in the art can design the logic required to implement these functions based on the description above.

The outputs of the comparators 160, 162, 164 and 166 are coupled to a bank of flip-flops 191 via corresponding lines 184, 186, 188 and 190, respectively. The bank of flip-flops includes four flip-flops having four clear inputs (C0–C3), four corresponding outputs (Q0–Q3), and a common preset input (P). A clear signal appearing on a clear input (e.g., C0) causes a signal on the corresponding output (e.g., Q0) to be deasserted. A preset signal appearing on the preset line P causes all of the signals on outputs Q0–Q3 to be asserted. When neither a preset signal nor a clear signal are present, the associated output signal remains in its current states.

The lines 184, 186, 188, and 190 are coupled to respective clear inputs C3, C2, C1, and C0. The preset input P is coupled to line 173 via line 193 to receive the clear signal from the logic circuit 172. The clear signal on line 173 becomes the preset signal on line 193 needed by the bank 191 to preset the outputs (Q0–Q3).

In operation, during a "write" that places the game card into mode 1, the output signals on outputs Q0–Q3 are preset, i.e., set to a logic high. The output signals remain preset until the corresponding clear signal is asserted by the associated comparator. Once the associated comparator produces a positive result, the preset output signal is cleared. As described above, the positive result occurs when the number of "reads" equals the corresponding numeric representation. The operation of the comparators and bank of flip-flops effectively implements a greater than or equal to function. Accordingly the equal to comparators (160, 162, 164, 166) and bank (191) could be replaced with greater than or equal to comparators.

The outputs of the bank 191 are coupled to corresponding inputs of a tristate driver 194. Also coupled to the tristate driver 194 are the discrete inputs 191 (BUTTONS) via bus 192. The tristate driver includes an enable input, as is known in the art, for receiving an enable signal on line 198 coupled between the logic circuit 172 and the enable input (EN). The logic circuit 172 generates an enable signal on line 198 responsive to a read signal on input 176 (READ) during mode 1. The tristate driver 194, responsive to the enable signal, transmits the outputs of the comparators as well as the discrete inputs to an output 196 (OUT8) coupled thereto. This output is coupled to the PC data bus 62, as is shown in FIG. 3.

In operation, the counter is initially cleared by logic circuit 172 responsive to a "write" to the game card during mode 1. Thereafter, responsive to each successive "read," the counter is incremented. The counter value is then compared to each of the numeric representations of the analog inputs by the respective comparator. The result of this comparison is provided to the tristate driver 194, which passes these results, along with the discrete inputs, to the PC data bus 62 over output 196. In the preferred embodiment, each "read" or "write" takes less than one PC bus cycle so that no wait states are required. A wait state, as is know in the art, is a mechanism for extending the bus cycle. If, however, slower components are used, wait states can be inserted to allow adequate time for the comparison to complete.

The game card 56 thus provides to the microprocessor a digital signal corresponding to the analog signal level of each analog input. The digital signal is asserted responsive to a "write" to the game card by the PC microprocessor and is deasserted responsive to a number of "reads" to the game card by the personal computer. The number of "reads" required to deassert the signal is determined by the corresponding analog signal level. This analog signal level is represented by the numeric representation stored in the latches.

Referring again to FIG. 3, a bus decode logic circuit 134 (BUSDECODE) is shown coupled between the PC control bus 62 and logic circuits 98 and 150. The logic circuit 134 decodes the control lines and generates three signals responsive thereto. The first signal is the mode signal produced on a first one (MODE) of the circuit's outputs. This mode signal indicates whether the game card is in mode 0 or mode 1. The default setting is mode 1, i.e., on power-up, and the game card is set to mode 0 responsive to a "write" to a base address (0200H). A "write" to the base address plus one (0201H) causes the mode signal to indicate mode 1. The state of the mode signal indicates which mode the game card is presently in.

The invention is not restricted, however, to the specific addresses described above, i.e., 0200H–0201H. Any two even and odd pair of addresses can be used. Since the IBM specification allocates addresses 0200H–020FH for the game card, the invention allows any even-odd pair within this range to be used. The pair is, in the preferred embodiment, manually selected by a jumper block. See, e.g, Bouton, U.S. Pat. No. 5,245,320, incorporated herein by reference, as an example of a game card using multiple addresses.

The second signal generated by the bus decode logic circuit 134 is a read signal on a second one (READ) of the circuit's output. This read signal indicates that the PC microprocessor is currently executing a read cycle to the game card. The third signal is a write signal on a third one (WRITE) of the circuit's outputs. This signal is generated during a "write" to the game card by the PC. One skilled in the art of digital design could design the logic circuit 134 to generate these three signals based on the above description.

Figure 8:
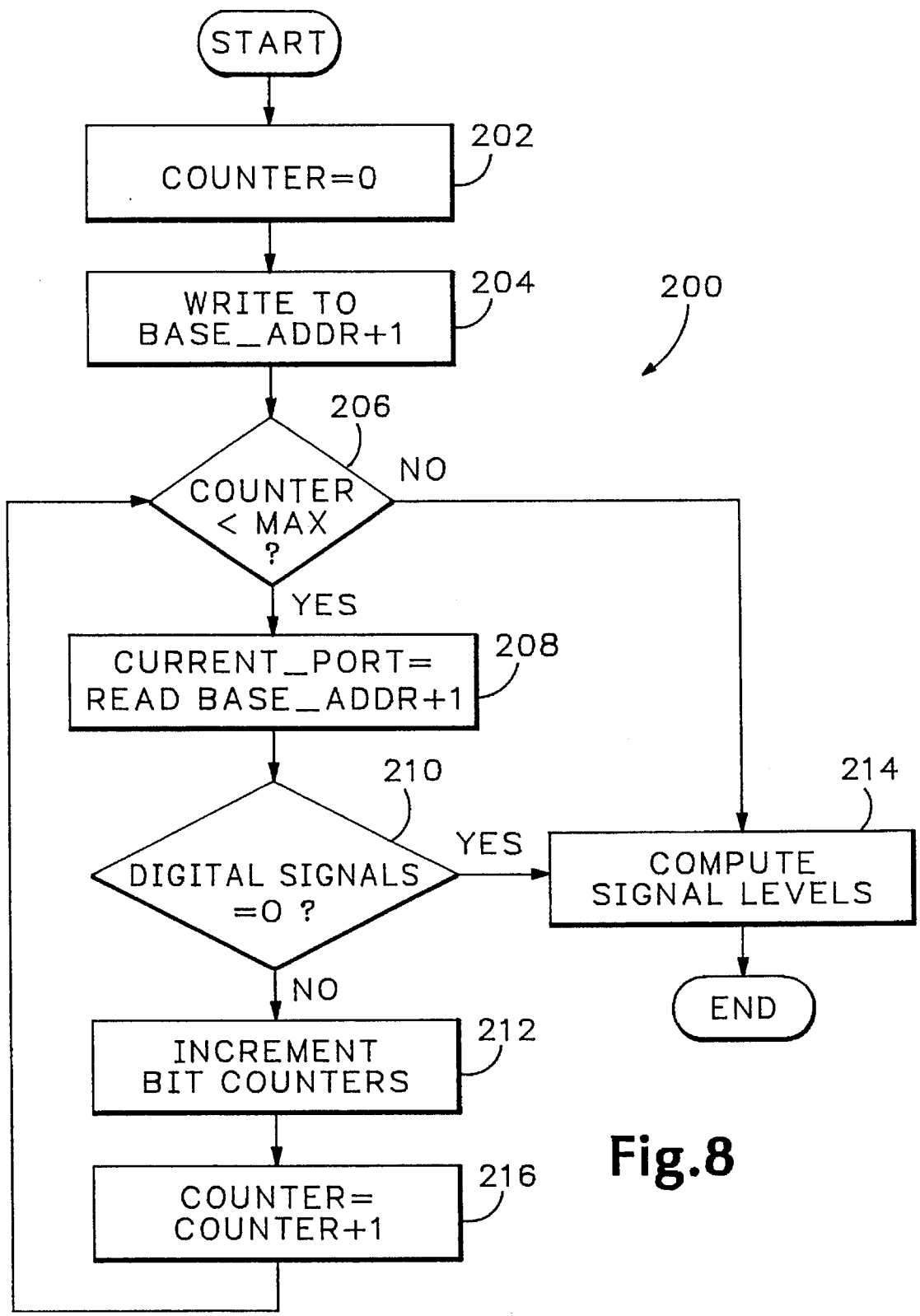
FIG. 8 is a flow chart of a method of processing analog signals of a game card according to a second aspect of the invention.

A process 200 for processing these digital signals corresponding to the analog signal levels is shown in FIG. 8. As will be apparent on examining FIG. 8, the process does not require that the interrupts be disabled. Instead, because the digital signals are dependent on the number of "reads" rather than the absolute time that expires over the course of those "reads," the interrupts can remain enabled during the course of the process.

The process 200 begins in step 202 by initializing a counter to 0. Next, the personal computer microprocessor executes a "write" to a base address plus one. A different address is used as compared with that shown in FIG. 6 in order for the game card to distinguish between the two modes. In the preferred embodiment, the address for this mode 1 is 0200H.

In step 206, the process compares the counter to a maximum counter value. This maximum counter value is determined by the resolution of the A-to-D converter of the microcontroller 70. In the preferred embodiment, the A-to-D converter is an 8-bit converter and therefore the maximum counter value is 256. If the counter value is less than the maximum counter value, the microprocessor in the personal computer executes in step 208 a "read" from the base address plus one and sets a current port variable (CURRENT_PORT) equal to the value read.

If the digital signals in the current port variable are all equal to 0, then the signal levels can be computed in 214. If, however, one or more of the digital signals are not equal to 0, then the process 200 increments individual bit counters in step 212. The process associates a bit counter with each digital signal. A bit counter is incremented in step 212 if the corresponding digital signal is asserted, as indicated in the corresponding bit of the current port variable. Thus, these bit counters count how many iterations of the loop that the digital signal was asserted. These bit counters are then used to compute the signal levels in 214.

In step 216, the counter variable is incremented and again compared to the maximum current value in step 206. Once this maximum counter value is reached, the signal levels are computed at step 214. Alternatively, the steps 208 and 212 are repeated until the digital signals are equal to 0. The term digital signals are used instead of the current port because four bits on the current port correspond to the discrete inputs. The comparison in step 210 is unaffected by these discrete inputs.

Once the loop has been exited, the signal levels are computed at step 214. This step uses the individual bit counters to compute a corresponding signal level. The signal levels are then provided to the video game to effect a corresponding response on the displayed images. The process 200 is, in the preferred embodiment, embodied in a software program executed by the personal computer microprocessor. This program can either operate stand alone or be integrated as part of the video game program. One having ordinary skill in the computer science art could implement a computer program which implements the process 200 based on the description given above.

Figure 9:
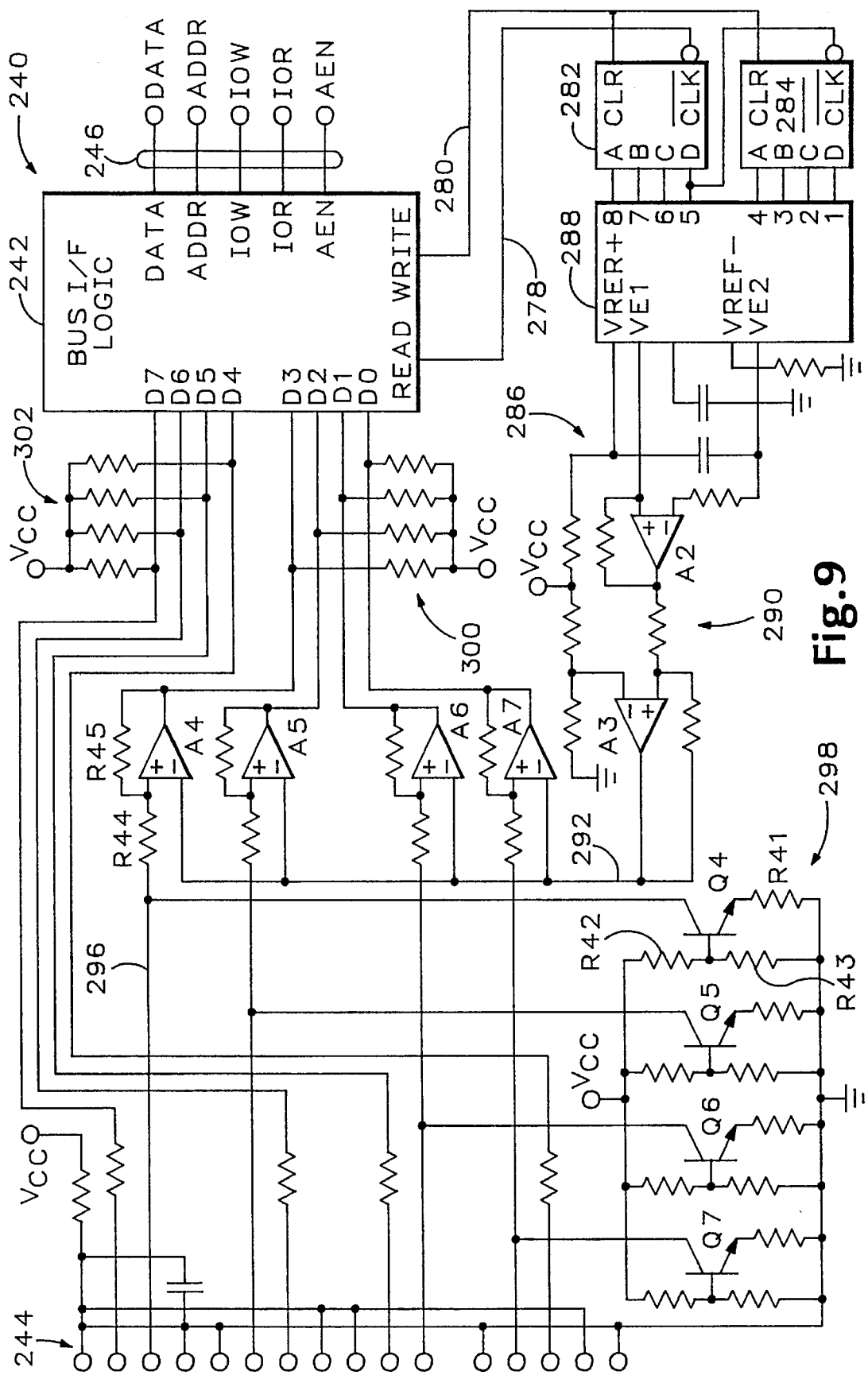
FIG. 9 is a schematic of an alternative embodiment of a game card according to the invention.

A second embodiment of this second aspect of the invention is shown in FIG. 9. This embodiment uses the same inventive principle as that described above with respect to the second aspect of the invention but uses different components to implement it. This embodiment eliminates the expense of a microcontroller and is therefore preferable for low-cost applications.

Referring now to FIG. 9, a circuit 240 for providing to the PC microprocessor a digital signal corresponding to each analog signal level is shown. As in the embodiment above, the digital signals are asserted responsive to a "write" to the game card by the personal computer microprocessor and are deasserted responsive to a number of "reads" to the game card by the personal computer. The number of "reads" required to deassert the signal is determined by the signal level of the corresponding analog signal.

The circuit 240 includes a bus interface logic circuit 242 that is coupled to the PC control and data bus 246 as well as the game card connector 244. The bus interface logic circuit 242 enables the game card to communicate with the personal computer over the PC data bus 246 using the conventional control signals (ADDR, IOR, IOW, AEN). The bus interface logic includes inputs (D7–D0) for receiving the discrete inputs, i.e. the buttons, as well as the digital signals corresponding to the analog input signals. The digital signals corresponding to the analog signals are coupled to the first four inputs (D3–D0) and the discrete inputs are coupled to the last four inputs (D7–4).

Figure 10:
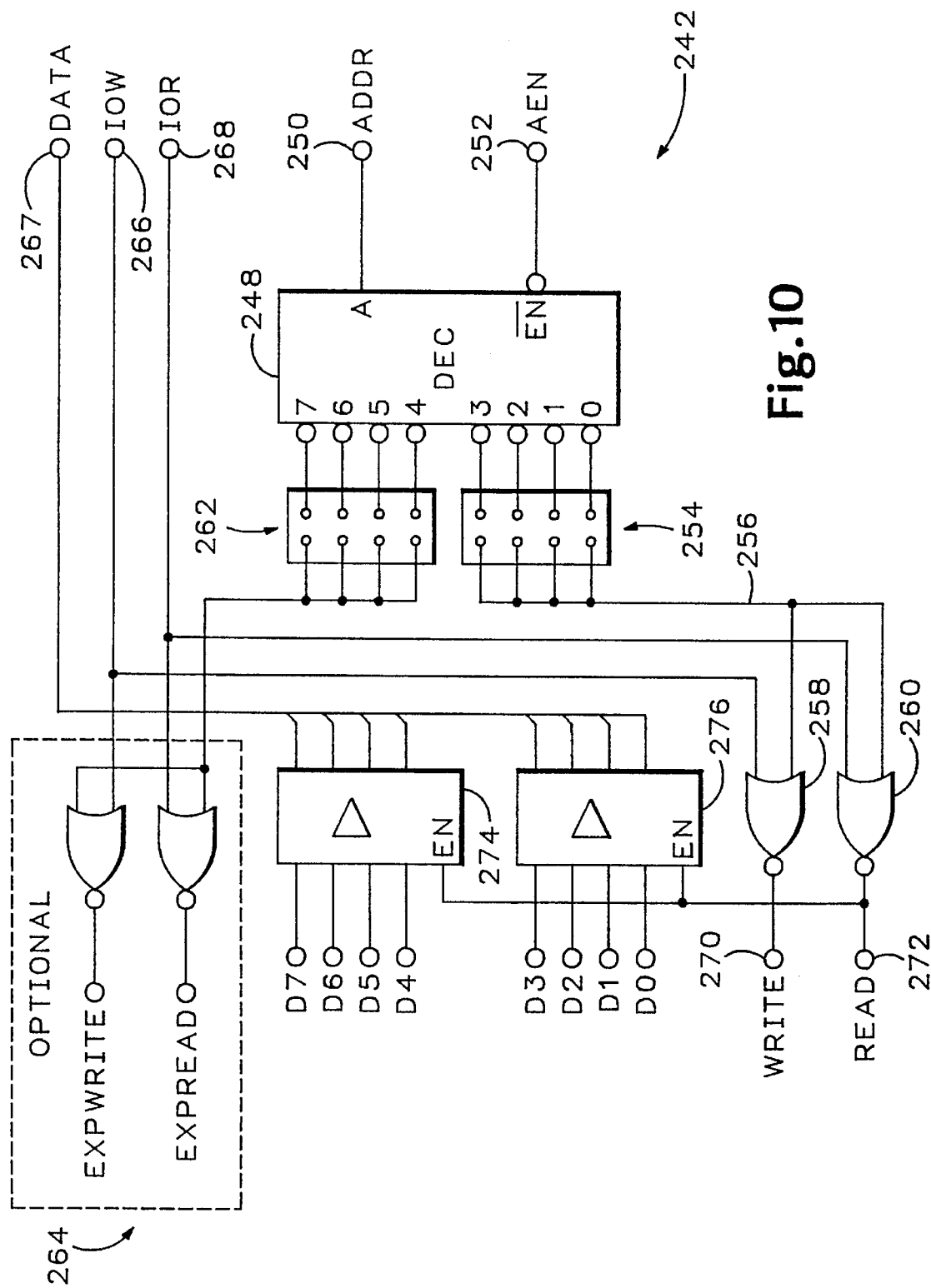
FIG. 10 is a schematic of the bus interface logic of FIG. 9.

A detailed schematic of the bus interface logic 242 is shown in FIG. 10. The embodiment shown in FIG. 10 is but one possible embodiment of the bus interface logic 242. The logic 242 includes a 3-to-8 decoder 248 which decodes the address on input 250 (ADDR) when enabled by an address enable signal applied to input 252 (AEN). The address and address enable signals are provided to the game card over the PC control bus 246. The lower order outputs of the decoder (3–0) are coupled to a first jumper block 254 for assigning an address to the game card. The jumper block 254 is optional. The output of the jumper block 254 is coupled by a line 246 to a first input of NOR gates 258 and 260. The upper four outputs of the decoder (7–4) are coupled to a second jumper block 262. The jumper block 262 is for selecting an address for a second port of the game card. In the embodiment shown in FIG. 9, only a single port is shown. It would be apparent to one of ordinary skill in the art how to replicate the design in FIG. 9 to support a second game port based on the description herein. Because this dual port is optional, NOR gates 264 are indicated as optional in FIG. 10.

A second input of NOR gate 258 is coupled to an input 266 (IOW) for receiving an I/O write signal generated by the personal computer. This I/O write signal indicates when the PC is writing to the game card. The output of the NOR gate 358 is coupled to an output 270 (WRITE) for generating a write signal, which indicates that the personal computer microprocessor is executing a "write" to the game card. Although the gate 258 is drawn as a NOR gate, the actual logic function is an add function where the inputs are active low. This equivalency follows from DeMorgan's theorem.

NOR gate 260 includes a second input coupled to input 268 (IOR) for receiving an I/O read signal from the personal computer. This I/O read signal is asserted when the personal computer is executing a "read" from the game card. The output of the NOR gate 260 is coupled both to an output 272 (READ) for providing a read signal to the tristate drivers 274 and 276 as well as to the rest of the circuit. The NOR gate 260 drives an enable input (EN) of the tristate drivers 274 and 276. The outputs of the drivers 274 and 276 are coupled to the PC data bus 246. Thus, when the selected address is detected by the decoder and an I/O read signal is generated by the personal computer, the tristate drivers 274 and 276 are enabled, thereby providing the signals at inputs (D7–D0) to the PC.

Referring again to FIG. 9, the bus interface logic 242 is coupled to a pair of four bit counters 282 and 284 via lines 278 and 280, respectively. Line 278 is coupled between the read output (READ) of the bus interface logic circuit 242 and a clock input (CLK) of counter 282. The most significant bit (D) of the counter 282 is coupled to the clock input of counter 284 to form an 8-bit ripple counter. Thus, when a read signal is generated by the bus interface logic 242 on line 278, the counters 282 and 284 are incremented. Alternatively a single 8-bit counter could be used in place of counters 282 and 284.

The write output (WRITE) of the bus interface logic is coupled to a clear input (CLR) on both counters 282 and 284. Thus, when a write signal is generated by the bus interface logic 242, responsive to a "write" by the personal computer to the game card, the counters 282 and 284 are cleared to 0.

The outputs of the counters 282 and 284 are coupled to a voltage ramp generator shown generally at 286. The voltage ramp generator 286 includes a voltage generator 288 that generates a voltage proportional to the output of the counters 282 and 284. This generator 288, in the preferred embodiment, is an 8-bit D-to-A converter part no. DAC0806 manufactured by National Semiconductor of Santa Clara, Calif. The output of the voltage generator 288 is coupled to an op-amp circuit 290 including two operational amplifiers A2 and A3 and an associated impedance network. The design of the op amp circuit 290, including the selection of the resistor values would be apparent to one skilled in the art of analog circuit design based on the description herein, and is therefore not described in detail.

In operation, the voltage ramp generator 286 generates a ramp voltage on a line 292 that is proportional to the number of "reads" by the personal computer microprocessor since the last write thereby. With each successive "read" to the game card by the personal computer microprocessor, the ramp voltage on line 292 ratchets up a predetermined amount, as determined by the voltage generator 288. This ramp voltage is then compared to each analog signal level by a corresponding comparator in order to determine the signal level of the analog signals, as described below.

The output of the ramp generator 286 is coupled to the inverting input of a plurality of op-amps (A4–A7) configured as comparators. The noninverting input of each op-amp (A4–A7) is coupled to a corresponding analog input on the game connecter 244 for receiving a corresponding analog input signal. These analog input signals are those generated by the variable input devices of the game controllers, e.g., the joystick.

Because each analog input is a variable resistance, a current sink 298 is coupled to each analog input. Drawing a fixed current through a resistance creates a voltage drop. The other end of the variable resistance is attached to +5 volts. A voltage is developed at the connection between the variable resistance and the current sink that varies as the resistance varies. This voltage can now be compared with the voltage generated by the ramp generator 286. Each current sink includes a single bipolar junction transistor (e.g., Q4), an emitter resistor (e.g., R41) and a resitive biasing network (e.g., R42 and R43). Other means for converting the variable resistance input to a corresponding analog voltage signal can be used as well.

The outputs of the op amps are coupled to the bus interface logic via a corresponding line. These lines have coupled thereto pull up resistors 300. Similarly, the discrete inputs coupled to the bus interface logic also include pull up resistors 302.

In operation, for each analog input signal, the corresponding comparator compares the analog signal level to the ramp voltage. If the ramp voltage is less than the analog signal level, the corresponding digital signal is asserted. If, however, the ramp voltage exceeds the analog signal level, the corresponding digital signal will be deasserted. Because the ramp voltage is proportional to the number of "reads," the digital signals generated by the circuit 240 are deasserted responsive to a predetermined number of "reads" by the personal computer microprocessor. The number of "reads" required to deassert the signal is determined by the signal level of the analog signal level itself. The method 200 for FIG. 8 can be used to process the digital signals generated by this second embodiment of this second aspect of the invention.

Having described and illustrated the principles of the invention in a preferred embodiment thereof, it should be apparent that the invention can be modified in arrangement and detail without departing from such principles. For example, the invention could be integrated on to a main circuit board, i.e., the "motherboard," thereby eliminating a separate game card board.

We claim all modifications and variation coming within the spirit and scope of the following claims:

1. A video game card for interfacing a game controller having one or more analog input devices to a personal computer including a microprocessor having digital data and control buses and a card slot for receiving I/O cards, the game card comprising:

a circuit board for mounting electrical components and connectors thereupon, the circuit board sized to fit in the card slot of the personal computer;

a game card connector for receiving an analog signal from the game controller, the analog signal having a signal level corresponding to a state of a corresponding game controller input device;

a bus connector for connecting the circuit board to the computer data and control bus; and a game card circuit for providing to the microprocessor a digital signal corresponding to the analog signal level, the circuit including means for asserting the digital signal responsive to a "write" to the game card by the personal computer microprocessor and means for deasserting the digital signal responsive to a number of "reads" sent to the game card by the personal computer, the "read" at which the digital signal is deasserted being determined from the analog signal level.

2. A video game card according to claim 1 wherein the circuit includes:

means for converting the analog signal to a binary count; and means for counting the number of "reads" sent to the game card by the personal computer microprocessor;

the means for deasserting the digital signal being operative to deassert said signal when the number of "reads" is equal to or greater than the binary count.

3. A video game card according to claim 2 wherein the converting means includes an analog to digital converter.

4. A video game card according to claim 3 wherein the converting means includes a resistance to voltage circuit interposed between the analog signal and the analog to digital converter for receiving the analog signal and converting the analog signal to an analog voltage signal.

5. A video game card according to claim 2 wherein the circuit includes a means for storing the binary count.

6. A video game card according to claim 2 wherein the deasserting means includes a comparator for comparing the binary count to the number of "reads."

7. A video game card according to claim 1 wherein the game card connector receives a plurality of said analog signals from the game controller, each analog signal having a signal level corresponding to the state of a corresponding game controller input device; the game card further comprising one of said game card circuits for each analog signal.

8. A video game card according to claim 7 wherein the game card circuits comprise:

a plurality of latches, each latch storing a binary count corresponding to each analog signal level;

means for counting the number of "reads" sent to the game card by the personal computer microprocessor; and a plurality of comparators having first and second inputs and an output, the first input of each comparator being coupled to the counting means and the second input of each comparator being coupled to a corresponding latch for comparing the counter count to the binary count of the corresponding latch, the output of each comparator indicating the result of the comparison.

9. A video game card according to claim 8 wherein the game card circuit includes a means for providing the comparator outputs to the personal computer microprocessor responsive to a "read" sent to the game card by the microprocessor.

10. A video game card according to claim 1 wherein the circuit for providing a digital signal to the microprocessor corresponding to the analog signal level includes:

means for establishing a ramp voltage, the ramp voltage being increased responsive to a "read" by the personal computer microprocessor; and means for comparing the ramp voltage to the analog signal level, the comparing means asserting the digital signal when the ramp voltage is equal to or greater than the analog signal level and deasserting the digital signal when the ramp voltage is less than the analog signal level.

11. A video game card according to claim 10 wherein the means for establishing a ramp voltage includes:

a counter for counting the number of reads by the personal computer microprocessor; and a voltage generator coupled to the counter, the voltage generator generating a ramp voltage proportional to the counter count.

12. A video game card according to claim 11 wherein the means for comparing the ramp voltage to the analog signal level includes:

a comparator having a first input coupled to the voltage generator for receiving the ramp voltage, a second input coupled to the game card connector for receiving the analog signal from the game controller, and an output for producing the digital signal; and a current sink coupled to the second input.

13. A video game card according to claim 12 wherein the comparator includes:

an operational amplifier having a first input, a second input, and an output; and an impedance network coupled to the operational amplifier.

14. A method of signalling to a digital personal computer a state of a controller input device having an analog signal corresponding to said state via a digital signal on a game card, the method comprising:

sampling the analog signal;

converting the sample to a binary count;

detecting a "write" sent by the personal computer to the game card;

asserting the digital signal responsive to the detected "write";

detecting a "read" sent by the personal computer to the game card;

counting the number of "reads" since the "write";

comparing the number of "reads" to the binary count; and deasserting the digital signal when the number of "reads" is equal to or exceeds the binary count.

15. A method of signalling to a digital personal computer the state of a controller input device according to claim 14 wherein the step of sampling the analog signal includes converting the analog signal to an analog voltage signal.

16. A method of signalling to a digital personal computer the state of a controller input device according to claim 15 wherein the step of converting the sample to a binary count includes storing the binary count.

17. A method of signalling to a digital personal computer the state of a controller input device according to claim 15 wherein the step of counting the number of "reads" since the "write" includes incrementing a counter responsive to each detected "read."

18. A method of signalling to a digital personal computer the state of a controller input device according to claim 15 wherein the step of asserting the digital signal responsive to the detected "write" includes setting a flip-flop to an asserted state.

19. A method of signalling to a digital personal computer the state of a controller input device according to claim 15 wherein the step of deasserting the digital signal when the number of "reads" is equal to the binary count includes setting a flip-flop to a deasserted state.

20. A method of signalling to a digital personal computer the state of a controller input device according to claim 15 wherein the step of detecting a "write" sent by the personal computer to the game card includes:

assigning a game card address to the game card;

comparing an address received from the personal computer with the assigned game card address; and detecting a "write" when the received address is equal to the game card address.

21. A method of signalling to a digital personal computer the state of a controller input device according to claim 20 wherein the step of assigning a game card address to the game board includes selecting one of a plurality of game card addresses.

22. A method of signalling to a digital personal computer the state of a controller input device according to claim 15 further including repeating each step for a plurality of analog signals corresponding to a plurality of controller input devices.

23. A video game/simulation system for simulating operation of a complex system having a plurality of user-controlled functions, the system comprising:

a computer having a microprocessor operable under control of a video game/simulation program, a display for displaying images produced by the program, and an input/output bus for connecting peripheral input and output devices to the microprocessor by producing a peripheral address and exchanging data therewith;

a video game/simulator controller having a plurality of input devices, each input device having an analog signal line for transmitting an analog signal corresponding to the state of the input device;

an interrupt resistant game card coupled to the input/output bus and having a game card connector coupled to the analog signal lines for receiving the corresponding analog signals from the video game/simulator controller, the game card having means for converting each analog signal to a corresponding digital signal, and means for asserting the digital signals responsive to a "write" sent to the game card by the computer microprocessor and deasserting the digital signals responsive to a number of "reads" sent to the game card by the computer, the "read" at which a digital signal is deasserted being determined by a level of the corresponding analog signal;

means in the computer for writing to the game card;

means in the computer for reading from the game card to receive the plurality of digital signals corresponding to the plurality of input devices of the video game/simulator controller; and means for effecting a corresponding change in the displayed images produced by the program responsive to the received digital signals.

24. A video game/simulation system according to claim 23 wherein the means for converting the analog signals to corresponding digital signals includes, for each analog signal:

means for asserting the corresponding digital signal responsive to the "write" sent to the game card by the computer microprocessor;

means for converting the analog signal to a binary count;

means for counting the number of "reads" sent to the game card by the computer microprocessor; and means for deasserting the digital signal when the number of "reads" is equal to or greater than the binary count.

25. A video game/simulation system according to claim 23 wherein the means for converting the plurality of analog signals to a corresponding plurality of digital signals includes:

means for establishing a ramp voltage, the ramp voltage being increased responsive to a "read" by the computer microprocessor; and means for comparing the ramp voltage to the analog signal level, the comparing means asserting the digital signal when the ramp voltage is equal to or greater than the analog signal level and deasserting the digital signal when the ramp voltage is less than the analog signal level.

26. A video game/simulation system according to claim 23 wherein the interrupt resistant game card includes:

a first connector coupled to the analog signal lines of the input device for receiving the corresponding plurality of analog signals from the controller; and a second connector for receiving a plurality of analog signals from a second controller.

27. A video game card for interfacing a game controller having one or more input devices to a computer including a microprocessor having data and control buses and a card slot for receiving I/O cards, the game card comprising:

a circuit board for mounting electrical components and connectors thereupon, the circuit board sized to fit in the card slot of the personal computer;

a game card connector for receiving an analog signal from the game controller, the analog signal having a signal level corresponding to a state of a corresponding game controller input device;

a bus connector for connecting the circuit board to the computer data and control bus;

means for converting the analog signal to a corresponding numeric representation responsive to a "write" sent to the game card by the computer; and means for providing the numeric representation of the analog signal to the computer responsive to a "read" sent to the game card by the computer, computer responsive to a "read" sent to the game card by the computer;

the game card connector including a plurality of analog signals from the game controller; and the means for converting the analog signal to a corresponding numeric representation including means for converting each analog signal to a corresponding numeric representation; and means for providing the numeric representation of the analog signal to the computer responsive to a "read" sent to the game card by the computer includes means for providing the plurality of said numeric representations at a single address;

the means for providing the plurality of numeric representations of said analog signals at a single address including:

a loadable counter;

logic means for loading the counter with an initial count responsive to a "write" sent to the game card by the computer and incrementing the counter responsive to a "read" sent to the game card by the computer; and means for selecting one of the plurality of numeric representations corresponding to the counter count responsive to a "read" sent to the game card by the computer.

28. A video game card according to claim 27 wherein the means for selecting one of the plurality of numeric representations includes:

a plurality of latches, each latch storing a numeric representation for a corresponding analog signal; and a decoder interposed between the counter and the plurality of latches, wherein the decoder receives the counter count and enables one the plurality of latches specified by the count responsive to a "read" sent to the game card by the computer.

29. A video game card according to claim 27 wherein the means for converting each analog signal to a corresponding numeric representation includes:

an analog multiplexer having a plurality of inputs coupled to the game card connector for receiving the plurality of analog signals from the game controller and an output for providing a selected one of the plurality of analog signals as a multiplexer output signal; and a converter circuit coupled between the analog multiplexer and the analog to digital converter for converting the multiplexer output signal to a voltage signal and providing the voltage signal to the analog to digital converter.

30. A game controller interface for interfacing the game controller to a computer, the computer being capable of executing "write" operations to the interface and "read" operations from the interface, the interface comprising:

a connector connectable to the game controller for receiving an analog signal from the game controller, the analog signal having a signal level corresponding to a state of a corresponding game controller input device;

means for converting the analog signal to a corresponding numeric representation;

means for providing the numeric representation of the analog signal to the computer responsive to a "read" sent to the game card by the computer during a first mode; and a circuit for providing to the computer a digital signal corresponding to the analog signal level during a second mode, the circuit including means for asserting the digital signal responsive to a "write" sent to the interface by the computer and means for deasserting the digital signal responsive to a number of "reads" sent to the interface by the computer, the "read" at which the digital signal is deasserted being determined from the analog signal level.

31. A game controller interface according to claim 30 further comprising means for switching between the first mode and the second mode.

32. A game controller interface according to claim 30 wherein the means for switching between the first mode and the second mode includes an address decoder for decoding a first address during the "write" corresponding to the first mode and a second address during the "write" corresponding to the second mode.

33. A game controller interface according to claim 32 wherein the means for switching between the first mode and the second mode includes:

means for selecting the first address; and means for selecting the second address.

34. A game controller interface according to claim 33 wherein the means for selecting the first address and the means for selecting the second address include a jumper block.

35. A game controller interface according to claim 30 wherein the means for deasserting the digital signal responsive to a number of "reads" includes means for recording the number of "reads" since the last "write."

36. A game controller interface according to claim 35 wherein the recording means includes a voltage ramp generator, the voltage ramp generator generates a ramp voltage that is proportional to the number of "reads" since the last "write."

37. A game controller interface according to claim 36 wherein the voltage ramp generator includes:

a digital-to-analog converter; and a counter coupled to the digital-to-analog converter for providing a count thereto, the counter count being incremented responsive to a "read" and being cleared responsive to a "write."

38. A game controller interface according to claim 35 wherein the recording means includes a counter for storing a read count, the read count being incremented responsive to a "read" and being cleared responsive to a "write."

39. A game controller interface according to claim 38 further comprising a comparator having a first input coupled to the counter for receiving the read count, a second input coupled to the converting means, and an output for providing a result signal corresponding to the results of the comparison.

40. A game controller interface according to claim 39 wherein the comparator is a greater-than or equal-to comparator.

41. A game controller interface according to claim 39 wherein the comparator is an equal-to comparator and wherein the circuit further includes a memory element coupled to the comparator, the memory element being asserted responsive to a "write" and being deasserted responsive to a positive result from the comparator.

* * * * *